(12) United States Patent
Warfel et al.

(10) Patent No.: US 10,997,662 B1
(45) Date of Patent: May 4, 2021

(54) TARGETED MESSAGING PROCESS

(71) Applicant: STATE FARM MUTUAL AUTOMOBILE INSURANCE COMPANY, Bloomington, IL (US)

(72) Inventors: Mark D. Warfel, Lincoln, IL (US); Ginger L. Hlebasko, Bloomington, IL (US); Rebecca L. Hill, Bloomington, IL (US); Jillian J. Wille, Normal, IL (US); Rama Kumari Naraparaju, Bloomington, IL (US); Michael E. Wilkerson, Bloomington, IL (US); Trent Durflinger, Bloomington, IL (US); Quincy J. Carolan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 730 days.

(21) Appl. No.: 14/816,338

(22) Filed: Aug. 3, 2015

Related U.S. Application Data

(60) Provisional application No. 62/127,891, filed on Mar. 4, 2015, provisional application No. 62/068,367, filed on Oct. 24, 2014.

(51) Int. Cl.
  *G06Q 40/00* (2012.01)
  *G06Q 40/08* (2012.01)
  *G06Q 30/02* (2012.01)
(52) U.S. Cl.
  CPC ........ *G06Q 40/08* (2013.01); *G06Q 30/0269* (2013.01)

(58) Field of Classification Search
  CPC ..................................................... G06Q 40/08
  USPC ............................................................. 705/4
  See application file for complete search history.

(56) References Cited

U.S. PATENT DOCUMENTS

| 10,282,785 B1 * | 5/2019 | Yager ..................... G06Q 40/08 |
| 2016/0037201 A1 * | 2/2016 | Kitts ................ H04N 21/44222 |
| | | 725/35 |

* cited by examiner

*Primary Examiner* — Edward Chang
(74) *Attorney, Agent, or Firm* — Marshall, Gerstein & Borun LLP

(57) ABSTRACT

Method and systems generate optimized and online targeted messages. Various campaign criteria are provided having different advertising or marketing goals that cause the delivery of targeted messages. Messages may be generated based upon customer data, customer preferences, life events, marketing campaigns, predictive models, and/or propensity scores. For instance, messages may be sent when a propensity threshold score is exceeded indicating a high likelihood of a milestone event, which may be indicative of customer behavior or an event that is relevant to the campaign goal, thereby sending more relevant messages to customers. A milestone propensity score may be calculated using a predictive modeling algorithm having weighted data variables, which may include data provided by the customer or accessed through various sources, such as monitoring customer online interactions with their permission. Aspects also include identifying customers that match campaign criteria by comparing propensity scores to thresholds to assist marketing and advertising efforts.

9 Claims, 5 Drawing Sheets

US 10,997,662 B1

TARGETED MESSAGING PROCESS

CROSS REFERENCE TO RELATED APPLICATIONS

This application claims the benefit of U.S. Provisional Patent Application No. 62/068,367, entitled "Improved Online Targeted Messaging Business Process," filed Oct. 24, 2014, and U.S. Provisional Patent Application No. 62/127,891, entitled "Improved Online Targeted Messaging Business Process," filed Mar. 4, 2015, the disclosure of each of which is hereby expressly incorporated by reference herein in its entirety.

FIELD OF THE DISCLOSURE

The present disclosure relates to systems, methods, apparatus, and non-transitory computer readable media for use in generating targeted messages and, more particularly, to using various types of data to send targeted messages to one or more users.

BACKGROUND

Often, insurance providers may use several marketing or advertising campaigns to reach out to potential new clients or to offer new services to existing clients. Such campaigns traditionally target large groups of people, such as current customers residing in a certain geographic region, for example. Traditional campaigns may also be launched using a limited set of data for the targeted group, such as names and addresses. By using only limited data, the messages of traditional campaigns may not be relevant for a large number of people in the targeted group, or be sent using a delivery channel that may not be preferred by some members of the targeted group.

BRIEF SUMMARY

In some aspects, method, apparatus, systems, and non-transitory media are described that may, inter alia, generate and deliver targeted messages to one or more users, who may be insurance policy customers, based upon various data sources such that the messages are optimized. These data sources may include stored user profile data associated with an insurance customer, data indicative of the customer's interactions with the insurer via a web-based application, and/or or more private, public, third-party, and/or proprietary sources. The described aspects include a messaging optimization engine directed to receiving data, processing the data, determining the type of message to send, determining the content of the message, and delivering the message to a customer when one or more conditions are satisfied as indicated in each respective campaign rule framework.

The rules used within the framework of each campaign may be directed to various types of advertising or marketing goals. Furthermore, the data received by the message optimization engine may optimize the message by tailoring the message content, language, delivery channel, etc., by interpreting the data in accordance with a propensity model. The propensity model may apply weights to one or more data variables retrieved from the various data sources to determine a customer's propensity to perform one or more actions and/or a customer's propensity to participate (or having participated in) an particular milestone event. If the propensity score is indicative of a behavior addressed by the campaign goal and exceeds a threshold score value, then the targeted message may be sent using a delivery channel and including message content in accordance with the specification of the campaign framework.

As data is collected from the various sources, campaigns may be designed addressing various goals using the collected data. The collected data may be analyzed to identify target groups that meet or exceed the criteria defined by a respective campaign. Additionally or alternatively, the data analyzed may reveal behavioral patterns, life-changing events, and/or user preferences regarding the mode of delivery of messages or communications. In this way, advertising and/or marketing messages may be optimized by sending content to a target group for whom the content has a high likelihood of being relevant.

In one aspect, a computer-implemented method of generating a targeted electronic message for delivery to an insurance customer may be provided. The method may include (1) receiving, by one or more processors, insurance customer data; (2) receiving, by one or more processors, insurance customer event data indicative of a potential insurance campaign milestone that is relevant to an insurance marketing or advertising goal; and/or (3) receiving, by one or more processors, insurance campaign criteria for the insurance marketing or advertising goal, the insurance campaign criteria may include (i) a threshold propensity score, and/or (ii) a delivery channel for delivering the targeted electronic message to the insurance customer. The method may also include (4) calculating, by one or more processors, a propensity score utilizing the insurance customer data and the insurance customer event data as variables in a mathematical propensity model, the propensity score being indicative of a probability that the insurance campaign milestone event has occurred or will occur; and/or (5) sending, by one or more processors, the targeted electronic message to the customer in accordance with the delivery channel specified by the insurance campaign criteria when the propensity score exceeds the threshold propensity score to facilitate enhanced insurance-related online advertising, marketing, and/or marketing campaigns. The method may further include receiving feedback customer related to insurance offerings, and/or adjusting insurance policies, rates, premiums, or discounts based upon the customer feedback to facilitate providing insurance-based cost savings to customers and/or enhancing an online customer experience. The method may include additional, less, or alternate actions, including those discussed elsewhere herein.

In another aspect, a non-transitory computer readable media may be described having instructions stored thereon in a computing device to generate a targeted electronic message for delivery to an insurance customer that, when executed by a processor, cause the processor to: (1) receive insurance customer data; (2) receive insurance customer event data indicative of a potential insurance campaign milestone that is relevant to an insurance marketing or advertising goal; (3) receive insurance campaign criteria for the insurance marketing or advertising goal, the insurance campaign criteria including (i) a threshold propensity score, and (ii) a delivery channel for delivering the targeted electronic message to the insurance customer; (4) calculate a propensity score utilizing the insurance customer data and the insurance customer event data as variables in a mathematical propensity model, the propensity score being indicative of a probability that the insurance campaign milestone event has occurred or will occur; and/or (5) send the targeted electronic message to the customer in accordance with the delivery channel specified by the insurance campaign criteria when the propensity score exceeds the threshold propensity score to facilitate enhanced insurance-related online advertising, marketing, and/or marketing campaigns. The non-transitory computer readable media may include instructions with additional, less, or alternate functionality, including that discussed elsewhere herein.

In yet another aspect, a message optimization engine may be described including a communication unit configured to: (1) receive insurance customer data; (2) receive insurance customer event data indicative of a potential insurance campaign milestone that is relevant to an insurance marketing or advertising goal; and/or (3) receive insurance campaign criteria for the insurance marketing or advertising goal, the insurance campaign criteria including (i) a threshold propensity score, and/or (ii) a delivery channel for delivering the targeted electronic message to the insurance customer. The message optimization engine may also include a processor configured to calculate a propensity score utilizing the insurance customer data and the insurance customer event data as variables in a mathematical propensity model, the propensity score being indicative of a probability that the insurance campaign milestone event has occurred or will occur. The communication unit may be further configured to send the targeted electronic message to the customer in accordance with the delivery channel specified by the insurance campaign criteria when the propensity score exceeds the threshold propensity score to enhance insurance-related electronic marketing or advertising. The message optimization engine may include additional, fewer, or alternate components, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

The present embodiments may, inter alia, generating optimized targeted messages for advertising and/or marketing purposes. An insurer, advertiser, marketer, etc., may construct one or more campaigns directed to one or more goals. The campaign may include a set of logic, rules, exceptions, preferences, targeted behavior and/or events, etc., establishing a campaign framework to accomplish the respective goal. To do so, aspects are described herein to obtain data from one or more data sources indicative of the actions, behavior, and/or information for one or more persons, whom may or may not be insurance customers. The collected data may be processed in accordance with a propensity modeling algorithm that attempts to determine a likelihood of certain behavior and/or milestone event occurring or having already occurred.

The propensity modeling algorithm may weight data sources indicative of different behaviors or actions in accordance with the rules defined by the campaign framework to calculate a propensity score for a specific type of action, behavior, and/or event. The campaign framework may include a threshold propensity score that, upon being met or exceeded, results in a specific type of targeted message being sent in accordance with that particular campaign. The targeted message may be optimized in any manner as specified by the campaign framework, such as content, a delivery channel, a media type, an insurance product, etc.

Analyzed data may also be processed to identity customers matching one or more campaigns based upon each campaign's respective threshold propensity score. This may be used as a powerful marketing and advertising tool by providing an initial base of relevant customers that may be further filtered such that the targeted message may be highly relevant to a group of customers identified as the targets of a specific campaign goal.

Exemplary Targeted Message Generation System

Figure 1:
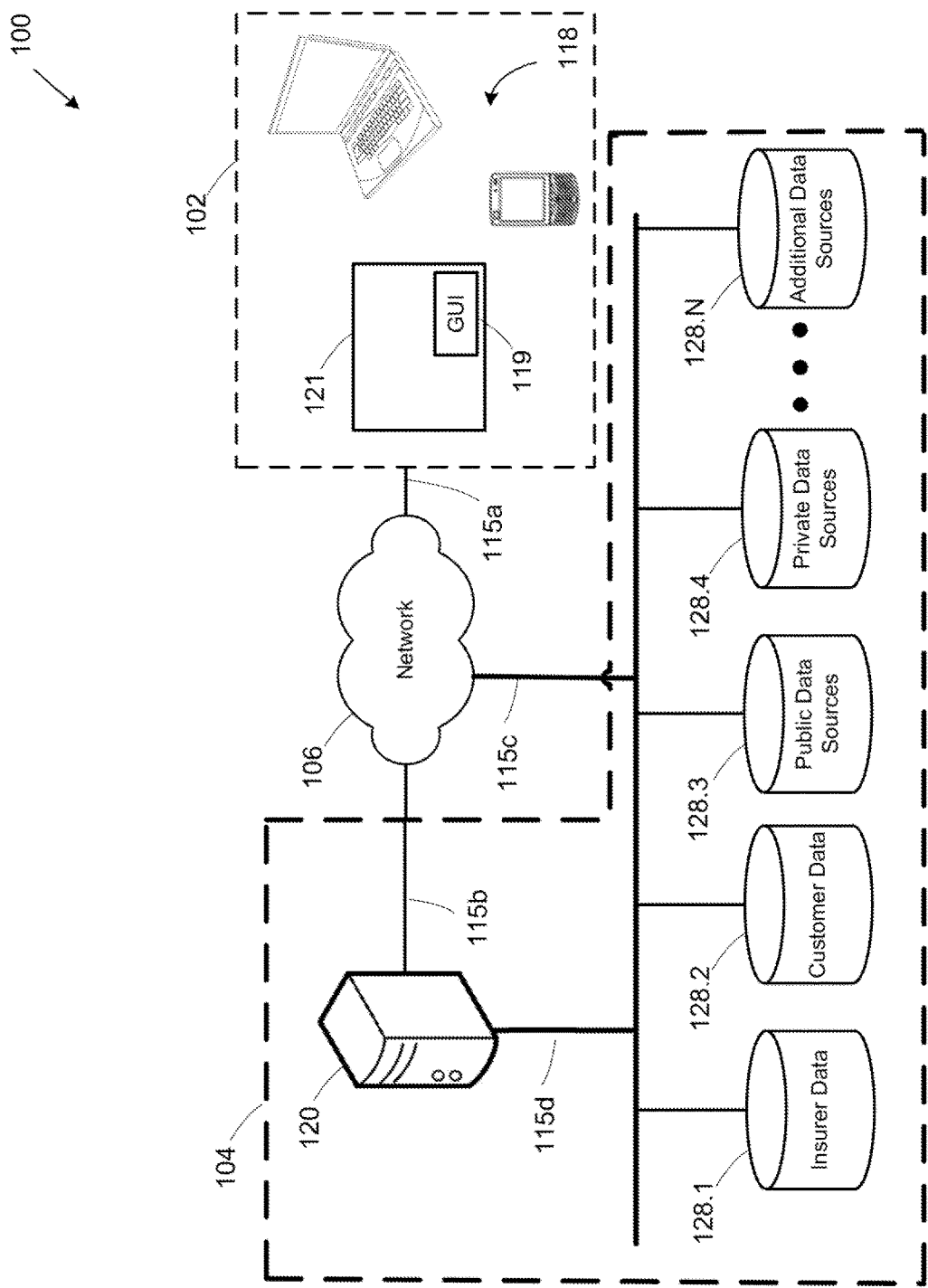
FIG. 1 illustrates a block diagram of an exemplary message optimization system 100 in accordance with one aspect of the present disclosure.

FIG. 1 illustrates a block diagram of an exemplary message optimization system 100 in accordance with one aspect of the present disclosure. Message optimization system 100 may facilitate the collection of data, identifying one or more users and/or customers whom meet the criteria specified by one or more campaign, the generation of one or more targeted messages based upon an analysis of the data, and/or the delivery of the targeted message via one or more communication channels. Message optimization system 100 may include a front end 102, a data system 104, and/or a communication network 106.

Front end 102 may be implemented as one or more devices 118, which may include suitable devices configured to facilitate user interaction and data exchange with communication network 106 and/or data system 104. For example, device 118 may be implemented as a mobile computing device or mobile device (e.g., smartphone, tablet, laptop, phablet, netbook, notebook, pager, personal digital assistant (PDA), wearable computing device, smart glasses, smart watch or bracelet, etc.), or other computing device capable of wired and/or wireless communication. I In various aspects, a device 118 may be configured to display a graphical interface (GUI) 119 within a web browser 121. Web browser 121 may be implemented as part of a web-based application to enable a user to interact with a respective device 118. Although FIG. 1 illustrates GUI 119 as part of web browser 121, message optimization system 100 may implement any suitable platform without departing from the spirit and scope of the present disclosure. For example, GUI 119 may be implemented as one or more parts of a dedicated application in addition to, or as an alternative to, a web-based application.

In various aspects, device 118 may be configured to communicate with communication network 106 to receive data from and send data to data system 104 via communication network 106. One or more devices 118 may be configured to receive data from data system 104 and to facilitate interaction between one or more devices 118 and a web-based application, which may be hosted, for example, via data system 104. For example, one or more computing devices 118 may be configured to send the user's answers and/or selected options displayed in GUI 119 to data system 104 and to receive data from data system 104 in response to this sent data. One or more devices 118 may facilitate communicating with data system 104 to obtain insurance product information, to display one or more quotes for insurance products, to display one or more targeted messages, etc.

In the present aspects, communication network 106 may be implemented as any suitable network configured to facilitate communications between front end 102 and data system 104. Communication network 106 may facilitate data communications in accordance with any suitable number and/or type of compatible communication protocols. Thus, links 115$a$, 115$b$, and 115$c$ may represent wired links, wireless links, or any suitable combination thereof.

For example, communication network 106 may include one or more telecommunication networks, nodes, access points, base stations, and/or links used to support data communications, and may facilitate a connection to the Internet for devices connected thereto. Accordingly, communication network 106 may include any suitable number and/or type of interconnected network components that form an aggregate network system such as, for example, dedicated access lines, plain ordinary telephone lines, satellite links, cellular base stations, public switched telephone networks (PSTN), a wireless telephony network (e.g., GSM, CDMA, LTE, etc.), a Wi-Fi network (e.g., via one or more IEEE 802.11 Standards), a WiMAX network, a proprietary network, a secure public internet, a mobile-based network, a virtual private network, etc., or any suitable combination thereof.

In various aspects, any of devices 118 included as part of front end 102 may communicate with communication network 106 via any suitable number of wired and/or wireless links. For example, one or more devices 118 that are part of front end 102 may communicate with communication network 106 wirelessly via one or more wireless links 115$a$. Although not illustrated in FIG. 1 for purposes of brevity, any communications between data system 104 and one or more devices 118 that are part of front end 102 may take place via any suitable combination of wired and/or wireless links between one another and/or any suitable number of networks, which may or may not include communication network 106.

Data system 104 may include one or more computing devices 120 and N number of data sources 128.1-128.N. In some aspects, computing device 120 may implement hardware and/or software components to facilitate communications with one or more data sources 128.1-128.N in accordance with any suitable number and/or type of communication protocols via any suitable number of links (e.g., via link 115$d$). In other aspects, computing device 120 may implement hardware and/or software components to facilitate communications with one or more data sources 128.1-128.N in accordance with any suitable number and/or type of communication protocols via network 106 (e.g., via links 115$b$ and 115$c$).

Although FIG. 1 illustrates data system 104 as implementing a single computing device 120 for brevity, data system 104 may include any suitable number and type of computing devices to facilitate the appropriate functions of the aspects as described herein. Furthermore, computing device 120 may be implemented as any suitable type of computing device configured to access data from one or more data sources 128.1-128.N and/or from one or more devices 118 that are part of front end 102, to identify target groups that meet or exceed the criteria defined by a respective campaign, to process the data to determine whether a targeted message should be generated in accordance with one or more campaign frameworks, to generate the targeted message, and/or to send the targeted message, etc.

With respect to insurance applications, a customer or potential customer may opt-in into an insurance program in which the customer or potential customer allows a network 106, data system 104, and/or other processor to gather and analyze certain information or characteristics about themselves, such as online or internet activities. Based upon the online interactions of the customer and/or other factors, targeted messages may be sent to the customer, such as based upon customer data, customer preferences, life events, marketing campaigns, predictive modeling, and/or propensity scores.

Although additional wireless links are not shown in FIG. 1 for purposes of brevity, computing device 120 may communicate with any of data sources 128.1-128.N using any combination of wired and/or wireless links. Furthermore, those of ordinary skill in the relevant art(s) will also appreciate that different types of networks and/or links may be implemented based upon the type of data that may be accessed from a respective data source 128.1-128.N.

For example, a private network and one or more secure links may be implemented to facilitate communications between computing device 120 and any of data sources 128.1-128.N (e.g., via link 115$c$) to enable computing device 120 to retrieve data of a sensitive, private, and/or proprietary nature. To provide another example, a link via the Internet may be implemented for communications between computing device 120 and any of data sources 128.1-N (e.g., via links 115$c$ and 115$d$) to enable computing device 120 to retrieve data that may be publicly available or otherwise accessible.

Data sources 128.1-128.N may include information that may be utilized by computing device 120 to generate one or more targeted messages for any suitable industry. Although data sources 128.1-N are illustrated in FIG. 1 as separate from computing device 120, various aspects may include any suitable amount of data that may be stored in any of data sources 128.1-N being additionally or alternatively stored in one or more storage components integrated as part of computing device 120.

Using the insurance industry as an example, computing device 120 may access one or more of data sources 128.1-128.N and/or data received via front end 102 to generate one or more targeted messages to promote a particular insurance product, to promote an insurance discount or program (such as safe driving programs or discounts; auto, life, health, or home insurance discounts based upon risk averse behavior, life styles, vehicle or home safety equipment or features, or functionality; etc.), to suggest that the user may qualify for one or more new policies to attempt to cross sell various other products to an existing customer, etc.

Additionally or alternatively, one or more data sources 128.1-128.N may include data used to facilitate various insurance product risk analysis and/or the calculation of insurance premium quotes. For example, a user may wish to obtain a homeowners or renters insurance quote, a car insurance quote, a life or health insurance quote, etc. A particular insurance quote calculation requires information to calculate risk assessment in accordance with the respective type of insurance policy requested. In accordance with various aspects, computing device 120 may facilitate the collection of information from a user and/or one or more of data sources 128.1-128.N to calculate an insurance quote and/or to send data to one or more devices 118 included in front end 102 to be displayed as an insurance quote to a user via browser 121. This information may be obtained from the user by, for example, displaying one or more prompts via GUI 119 and receiving the user's answers to these prompts.

In one aspect, each of data sources 128.1-128.N may include information that may be accessed via computing device 120 to generate a targeted message in accordance with a campaign criteria, which is further discussed below. Each of data sources 128.1-128.N may additionally or alternatively include data that may be received from one or more devices 118 via communication network 106. This data may include, for example, data indicative of a user's online interactions, which may include interactions with a web-based application hosted by computing device 120, for example.

To provide another example, this data may include data indicative of a user's online interaction or habits such as logon credentials, updates to a user's stored profile data, geographic location data indicating a location of one or more devices 118, etc. In one aspect, computing device 120 may identity a user's identity via logon credentials supplied by the user (e.g., a generated access token in the user authentication process) while interacting with computing device 120 via a suitable web-based application. Once identified, computing device 120 may further associate the user's identity with the user's profile data, and utilize this data alone or in conjunction with data retrieved from one or more other data sources 128.1-128.N to determine whether a message should be sent to the user in accordance with the goals and rules specified by the campaign framework.

In accordance with various aspects, each of data sources 128.1-N may include different types of information that may be utilized by computing device 120 to determine whether one or more campaign rules have been satisfied for one or more users, to identify target groups that meet or exceed the criteria defined by a respective campaign, to generate a relevant target message, and/or to deliver the target message, etc.

For example, insurer data source 128.1 may include information such as the insurer's product offerings, information used to calculate a quote for each insurance product, data associated with user profiles for one or more insurance customers, open claim information, information regarding one or more insurance policies issued to the user, an amount paid on claims opened by the user, the causes of claims being opened, losses claimed by the user and the policies associated therewith, restrictions placed upon the delivery of targeted messages such as legal compliance, exceptions, user opt-in or opt-out information, a history of previously calculated propensity scores and their associated campaigns, payment types and/or preferences, user bank account information, etc.

In the present aspects, insurer data source 128.1 may include, for example, proprietary information that has been collected by the insurer. Proprietary information may include any suitable data related to the user that may be collected and/or mined from one or more sources that may not otherwise be readily or conveniently available via public channels. This propriety information may include, for example, information gathered from third party sources via one or more contractual agreements that the insurer has made with third party data providers, such as demographic information regarding the user's age, location, and/or occupation, etc.

Examples of the types of proprietary data that may be stored in insurer data source 128.1 may include information gathered from third party sources related to the user's credit score history, vehicle event data recorder information, risk profile data, relevant data used for insurance underwriting, etc. Although some of this information may be publicly available, this information may not be easily obtained online and/or may need to be appropriately formatted for data source storage. Therefore, examples of third party sources of such proprietary information may include any suitable source of census reports, crime reports, vehicle history reports, etc.

In the present aspects, customer information data source 128.2 may include, for example, any suitable type of customer data, such as insurance customer data, for example. Examples of insurance customer data may include, for example, user profile data, information collected from the customer across any line of insurer business and/or collected from the customer via any insurer channel (e.g., from agent interactions, from phone calls with the customer, from interactions with a web-based application, etc.). This information may include, for example, data stored from previously calculated quotes and/or from previous interactions between the insurer and the customer.

For example, if a customer currently has one type of insurance policy with an insurance provider, then customer information data source 128.2 may store the user's profile data in additional to, or as an alternative to, data source 128.1. User profile data may include any suitable type of data based upon the type of services provided to the user. For example, a user may create a user ID, password, and other information when initially registering an insurance policy or other account with the relevant party (e.g., an insurer). The user profile data may be created, for example, as part of a registration process via a web-based application hosted by computing device 120, via another website, over the phone, etc.

Additional examples of the information stored in customer information data source 128.2 may include names of the user's dependents, the user's agent, the user's home address, the user's date of birth, social security number, and/or driver's license number, user preferences such as previously submitted control options, preferred insurance policy delivery methods (e.g., paper versus electronic), a user's current location derived from the front end device 102 utilized by the user, genetic and/or medical history information, health screening results, etc.

In the present aspects, data source 128.3 may represent one or more public data sources. Data source 128.3 may include information about the user that may be readily available via one or more public channels. Examples of public data source information may include a user's current address, registered vehicles, mortgage information, state coverage minimums, marital status, etc. Examples of the public data sources may include the United States Post Office (or other applicable post office of a respective country), city record data, and/or publicly available social networking data, such as data collected from a networking website (such as LinkedIn and/or publicly available Facebook pages, for example).

In the present aspects, data source 128.4 may represent one or more private data sources. Examples of private data source information may include unlisted phone numbers, the user's wedding date, the user having a child or an addition to his family (e.g., through adoption records), the user's interests and/or hobbies, the user's online behavior, user account information such as credit card accounts, financial institutions, etc. Examples of private data sources may include private social networking data (e.g., non-public Facebook pages) and/or the user's browser history, for example.

To provide additional examples, private data sources may include data indicative of a user's browsing habits, which may include interactions with a web-based application hosted by the insurer or other online interactions. These interactions may include, for example, a user's responses to one or more prompts or fields displayed on one or more websites, Internet cookies, the length in which a user remained on each visited page, search strings used by the user (e.g., "cancel policy"), webpage viewing times, webpage loading times, a sequence of webpages visited by the user, the last agent contacted by a user, media clips that a user has watched, a duration of viewing, what players were used to view media clips, webpages visited based upon a user's interest (e.g., revealing whether the user has children or is planning to, gardening interests, home improvement projects, etc.), purchasing channels indicating a user's preferred channel of receiving targeted messages, data identifying a type of device and/or operating system used by the user, a user's language preferences, network speed, demographic data, income data, etc.

To comply with state, local, and/or federal privacy regulations, the insurer may obtain the user's consent to access this information utilizing one or more prompts generated via GUI 119. For instance, a user may opt-in into an insurance provider's program that provides insurance-related benefits or cost savings to the user/insured.

One or more data sources 128.1-128.N may be configured to store and/or access data that may be of a private, proprietary, and/or sensitive nature. As a result, the present aspects may include data system 104, communication network 106, and/or front end 102 implementing appropriate security protocols such as encryption, secure links, network authentication, firewalls, etc., to appropriately protect and secure sensitive and/or private data.

As a user interacts with a web-based application hosted by computing device 120, aspects include computing device 120 storing data to one or more data sources 128.1-128.N indicative of not only the user's answers, quotes, etc., but data indicating an assessment of the user's behavior while interacting with the web-based application. For example, indicators of the user's behavior may be represented by a user's style of navigation within the web-based application; whether the user started but did not complete a quote process; whether the user changed his address or other contact information; whether the user changed a preferred communication channel; whether the user updated the vehicle on a car insurance policy; whether the user added coverage for an additional person or changes limits, deductibles, coverages; whether the user added different types of insurance products (such adding or increasing an amount of life insurance); etc.

This user behavioral assessment may be utilized alone or in conjunction with data retrieved from one or more other data sources 128.1-128.N to determine whether a message should be sent to the user in accordance with the goals and rules specified by the campaign framework. In the aggregate, data from one or more of data sources 128.1-128.N that may be analyzed to determine a user's behavior, a user's likelihood to engage (or having engaged) in a certain behavior, the likelihood of a milestone event having occurred (or that is likely to occur) based upon the campaign criteria goal may be referred to as customer event data or, in the specific use of insurance data, as insurance customer event data.

In one aspect, computing device 120 may store and/or access campaign framework data from one or more data sources 128-1-128.N. Additionally or alternatively, computing device 120 may be configured to locally store campaign framework data. As further discussed below, the campaign framework data may indicate one or more rules, logic, and/or conditions utilized in conjunction with a campaign goal, and/or may include timing for when the campaign is applicable. Additionally or alternatively, the campaign framework data may include a delivery channel for the targeted message, the targeted message content, a type of media for delivering the targeted message, a targeted message language, a frequency in which to execute the campaign framework as part of a batch process (discussed further below), etc.

The campaign framework data may include a threshold propensity score that, once met, results in the targeted message being generated and sent to one or more users in accordance with a delivery channel as indicated by the campaign framework data. In the present aspects, computing device 120 may be configured to process data from one or more data sources 128.1-128.N and/or from front end 102 by applying the data as variables to a propensity model. The propensity model may assign a numeric weighted value to certain portions of the data and/or to certain identified behaviors, events, conditions, etc., represented by the data. Further in accordance with such aspects, the output of the propensity model may be a numeric propensity score.

To provide an illustrative example, a campaign framework may have a goal directed towards retaining customers likely to leave the insurance company or terminate a policy. The campaign framework data may specify logic to weigh data from various data sources in accordance with a mathematical propensity model and that the threshold propensity score is 75%. Continuing this example, the mathematical propensity model may be tailored to weigh data that is more indicative of a customer defecting, and less weight (or no weight) to other data sources. The propensity model in this example may be constructed utilizing baseline propensity models using one or more variables known to be associated with the behavior of insurance customers defecting. In this way, the propensity model may be customized to yield a propensity score commensurate with tested results.

For example, a propensity model may consider customer browser history indicating that the customer has recently shopped online at a certain number of competitor sites within a certain period of time (e.g., 3 competitor sites within 2 days). The number of competitor sites may be considered a first variable "A," while the period of time in which the sites were viewed may be considered a second variable "B." Furthermore, the customer's policy expiring within a threshold period of time (e.g., 2 months) may be considered as a third variable "C".

Computing device 120 may calculate an increased propensity score by weighing variables A, B, and C such that as the number of competitor sites increases variable A increases in value, as the period of time in which the sites were visited decreases, variable B increases in value, and as the period of time until policy expiration decreases, the variable C increases in value. Various aspects include the propensity model assigning the weights applied to each of these variables being the same or different weights as one another.

Thus, continuing this example, as variables A, B, and C increase in value the calculated model propensity score approaches unity, or a 100% chance that the customer will defect. The propensity model may be constructed using any suitable number of variables and/or weights such that a propensity model score may be calculated having values reflecting a desired propensity in accordance with a campaign goal, which may be based upon known propensity data. Known propensity data may be obtained in any suitable manner, such as market research data, surveys, test groups, etc.

Continuing the previous example, upon the propensity score meeting or exceeding the threshold propensity score indicating a high likelihood that a customer will defect (e.g., 75%, 90%, etc.), computing device 120 may be configured to generate and deliver a targeted message as indicated by the campaign framework data. The targeted message may include, for example, promotions regarding additional discounts, informing the customer that he qualifies for a special limited time promotional premium rate, etc.

Computing device 120 may be configured to send a targeted message in accordance with any suitable delivery channel and/or media and/or to execute any suitable number of campaigns in accordance with any schedule or timing. The targeted message may be in an electronic format or a physical format. Furthermore, if the campaign framework and/or user profile indicates a preferred communication channel for the customer, then computing device 120 may be configured to send the targeted message in accordance with the preferred communication channel. For example, the targeted message may be sent to the customer using U.S. postal mail, email, short messaging service (SMS) messaging, a web banner message placed in a suitable portion of GUI 119 of web browser 121, etc.

Additionally or alternatively, computing device 120 may be configured to execute campaign batch processes using propensity score calculations to data associated with any suitable number of customers or non-customers. For example, computing device 120 may use a set of variables to calculate a propensity score using data associated with a number of users, which may be a large group (e.g., greater than 1000 users). In some aspects, this group may be selected from a target area in which members of the group have a common characteristic, such as those within a certain geographic or demographic region, a zip code, etc. In other aspects, the groups may be chosen on a random basis.

Regardless of how the groups are selected, aspects include computing device 120 calculating, for each member of the group, a respective propensity score in the same manner using the variables specified for a campaign framework. The targeted messages may be sent to those users in the group having a propensity score that meets or exceeds the threshold propensity score as indicated by each respective campaign on which the data is executed. In this way, by accessing data from data sources 128.1-128.N, multiple campaigns may be maintained and applied to multiple groups of people, and/or targeted messages may be sent to those members within each group in which the targeted message has a higher likelihood of being relevant.

Data sources 128.1-128.N are illustrated in FIG. 1 and described herein as storing various different types of data, such as insurance customer data and insurance customer event data, for example, that may be accessed and processed by computing device 120. However, this distinction is made for purposes of brevity to distinguish between possible sets of data sources. Various aspects include any suitable type of data being stores in one or more of data sources 128.1-128.N regardless of the naming convention used to describe each of the data sources.

Exemplary Message Optimization Engine

Figure 2:
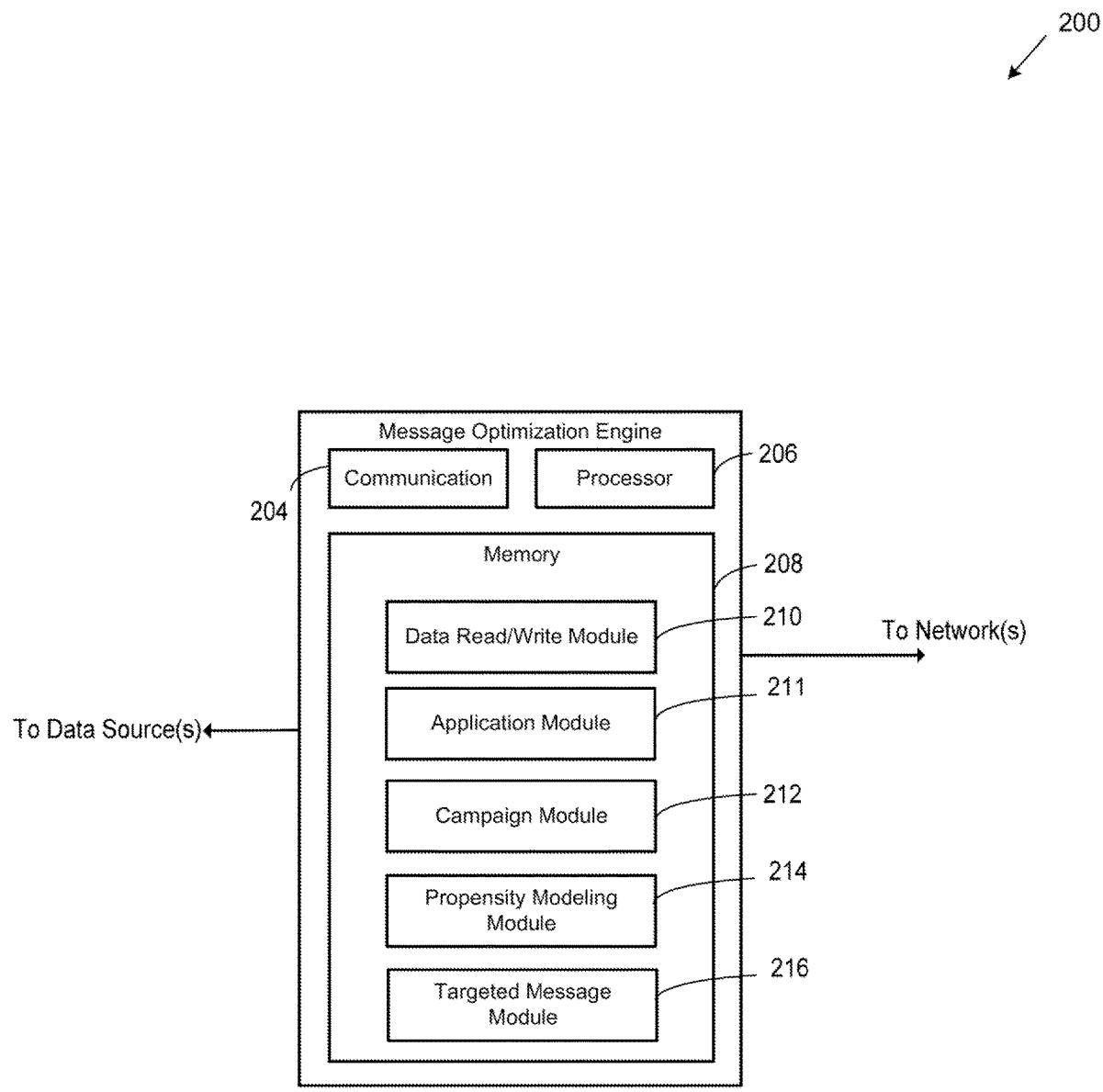
FIG. 2 illustrates a block diagram of an exemplary message optimization engine 200 in accordance with one aspect of the present disclosure.

FIG. 2 illustrates a block diagram of an exemplary message optimization engine 200 in accordance with one aspect of the present disclosure. Message optimization engine 200 may include communication unit 204, processor 206, and/or memory 208.

Message optimization engine 200 may be implemented as any suitable computing device. In various aspects, message optimization engine 200 may be implemented within a server, a desktop computer, etc. In one aspect, message optimization engine 200 may be an implementation of computing device 120, as shown in FIG. 1.

Communication unit 204 may be configured to facilitate data communications between message optimization engine 200 and one or more data sources and/or networks, such as one or more of data sources 128.1-128.N and/or communication network 106, as previously discussed with reference to FIG. 1, for example. Communication unit 204 may be configured to facilitate communications between one or more data sources 128.1-N and/or network 106 in accordance with any suitable number and/or type of communication protocol, which may be the same communication protocols as one another or different communication protocols.

In the present aspects, communication unit 204 may be implemented with any suitable combination of hardware and/or software to facilitate this functionality. For example, communication unit 204 may be implemented with any suitable number of wired and/or wireless transceivers, network interfaces, physical layers (PHY), etc. Communication unit 204 may optionally enable communications between message optimization engine 200 and one or more communication networks, such as communication network 106, for example, as previously discussed with reference to FIG. 1.

In various aspects, communication unit 204 may be configured to utilize the same or different communication protocols to facilitate respective communications between one or more data sources 128.1-128.N and network 106. In one aspect, communication unit 204 may be configured to send targeted messages to one or more devices included in a front end, such as front end 102, for example, as shown in FIG. 1.

Communication unit 204 may send data in accordance with one or more applications (e.g., web-based applications) hosted on message optimization engine 200 and accessed via one or more devices that are part of a front end, such as devices 118, for example, as shown in FIG. 1. Communication unit 204 may send data that enables one of more devices to display one or more prompts, options, and/or selections in accordance with such applications. Communication unit 204 may be configured to receive data from one or more devices, such as devices 118, for example, as shown in FIG. 1. Data received via communication unit 204 may include, for example, answers to prompts, options, and/or selections displayed on one or more devices included as part of a front end. Additionally or alternatively, this data may include insurance customer data, insurance customer event data, browsing history, Internet cookies, etc.

In various aspects, the data received from front end devices may be processed by communication unit 204 and/or processor 206 and utilized to determine a propensity score in accordance with a particular campaign framework, as previously discussed with reference to FIG. 1.

Processor 206 may be configured to communicate with memory 208 to store to and read data from memory 208. In accordance with various aspects, memory 208 may be a computer-readable non-transitory storage device and may include any combination of volatile (e.g., a random access memory (RAM)), or a non-volatile memory (e.g., battery-backed RAM, FLASH, etc.). Memory 208 may be configured to store instructions executable on processor 206. These instructions may include machine readable instructions that, when executed by processor 206, cause processor 206 to perform various acts. Data read/write module 210, application module 211, campaign module 212, propensity modeling module 214, and/or targeted message module 216 may be portions of memory 208 configured to store instructions executable by processor 206.

Data read/write module 210 may include instructions that, when executed by processor 206, causes processor 206 to read data from and/or write data to one or more of data sources (e.g., data sources 128.1-128.N, as shown in FIG. 1) and/or to communicate with one or more devices (e.g., devices 118, as shown in FIG. 1) via communication unit 204. In one aspect, data read/write module 210 may enable processor 206 to query data from one or more of data sources, to store data retrieved from one or more data sources in memory 208 (or in one or more data sources), and/or to store data received from one or more devices via one or more networks in memory 208 (or in one or more data sources). Further in accordance with such aspects, data read/write module 210 may include instructions that enable processor 206 to access stored data from memory 208 to work in conjunction with the functions performed when executing instructions stored in application module 211, campaign module 212, propensity modeling module 214, and/or targeted message module 216.

Application module 211 may be a portion of memory 208 configured to store instructions that, when executed by processor 206, cause processor 206 to execute one or more supporting applications, which may include, for example, hosted web-based applications, local applications facilitating batch campaign processing, etc. When executed by processor 206, instructions stored in application module 211 may cause processor 206 and/or communications unit 204 to facilitate communications with one or more devices in accordance with a suitable web-based application.

For example, referring back to FIG. 1, executable instructions stored in application module 211 may enable communications unit 204 to send data to one or more devices 118, causing the respective device to display one or more options, web pages, and/or prompts to a user. As the user interacts, selects, and/or navigates with the options, web pages, and/or prompts, the user's interactions may be received in accordance with the relevant web-based application by processor 206 executing instructions stored in application module 211.

Additionally or alternatively, instructions stored in application module 211, when executed by processor 206, may facilitate message optimization engine 200 receiving data regarding a user's web browser history, calculating one or more insurance premium quotes in accordance with a relevant web-based application, enabling a user to update his user profile data, delivering targeted messages in a suitable format to one or more users via one or more devices (e.g., banner graphics within the web-based application), etc.

Furthermore, instructions stored in application module 211, when executed by processor 206, may facilitate message optimization engine 200 performing batch campaign processing, which may identify groups of users and/or customers that meet various campaign criteria, optimize these groups by applying one or more filtering processes, etc. Batch campaign processing is further discussed below with reference to FIG. 3.

Campaign module 212 may be a portion of memory 208 configured to store instructions, that when executed by processor 206, cause processor 206 to determine campaign criteria in accordance with one or more campaigns. As will be further discussed in the illustrative examples provided below, aspects include campaign module 212, when executed by processor 206, causing message optimization engine 200 to collect data, to determine whether a targeted message should be generated and/or sent to a user, and/or the delivery channel to send the targeted message. Each of the functions that ultimately result in a targeted message being sent to one or more users may be defined in campaign module 212 as part of each respective campaign framework rules, logic, restrictions, exceptions, and/or propensity score threshold.

The campaign criteria stored by campaign module 212 may include any suitable number of campaign criteria for any suitable number of respective campaigns, which may be programmed, loaded, and/or retrieved by message optimization engine 200 using any suitable techniques. For example, an employee may select campaign criteria based upon one or more sets of campaign goals and store these campaign criteria in campaign module 212 by accessing memory 208, loading the campaign criteria into memory 208 from another data source (e.g., one or more data sources 128.1-128.N), etc.

The campaign criteria may include any suitable type of data relevant to a particular campaign goal for which targeted messages are generated and delivered and/or for which a campaign batch process is executed. The campaign criteria may include, for example, a threshold propensity score indicative of a campaign milestone event has occurred (or will occur) that is relevant to an insurance marketing or advertising goal.

In various aspects, the business logic and rules that are part of the campaign criteria may include exception and/or restriction conditions that, when applicable, negate sending of the targeted message even if the threshold propensity score is met. To provide additional examples, the business logic and rules may include a timing for when the campaign criteria is applicable (e.g., the campaign is only applied to customers having an insurance policy that expires within two months for a campaign goal directed to maintaining customers likely to defect upon expiration of an insurance policy); a geographic location and/or demographic data for which the campaign is to be applied; specific insurance products for which the campaign is to be applied; prioritization rules resolving conflicts arising from a user meeting the conditions of more than one campaign goal; etc.

Regarding campaign milestone events, such events may include any suitable type of event having a high likelihood of either having occurred or that may likely occur in the future, based upon the propensity score model output. The campaign milestone events may be of a significant importance and may indicate a change in the customer's behavior, a life-changing event (marriage, divorce, birth of a child, death in the family, change of address or employer, change in health, purchase of a new home or vehicle, etc.), and/or any suitable type of event that may signal a change in the user's product needs and/or use of current products.

To provide an example of a campaign milestone event, a customer may have moved to a new address, be interested in moving to a new address, recently purchased a new home and/or be interested in purchasing a new home (e.g., using propensity model data variables from public data sources, browser history, and/or a user's profile data being changed), which may indicate that the insurance customer is in need of a new homeowners insurance quote. To provide another example, the insurance customer may have purchased a new vehicle or be interested in purchasing a new vehicle, which may indicate that the customer may require a new vehicle insurance quote.

To provide yet another example, the insurance customer may have recently undergone a life-changing event such as getting married or having a child, which may indicate that existing quotes may need to be modified to add the new person and/or the customer may be more interested in purchasing a life insurance policy. To provide an additional example, the insurance customer's policy may have expired and/or the insurance customer may be interested in terminating an insurance policy.

In some aspects, the data used to determine a milestone event may be ascertained from insurance customer data and/or event data directly. For example, if a user changes her user profile data indicating that her marital status has changed and she is now married, aspects include campaign module 212 including instructions to identify the milestone event using this data without the use of propensity modeling, as propensity modeling may be unnecessary in the case when an event is explicitly identified in this manner. Additionally or alternatively, when an explicit event is identified in such a manner, aspects include campaign module 212 having instructions to conclude that either the propensity modeling output is 100 percent for the corresponding event and/or to automatically send the targeted message in accordance with the campaign criteria and omitting the propensity modeling.

In other aspects, the data used to determine a milestone event may be ascertained from insurance customer data and/or event data indirectly or implicitly. Using the previous example, if a user changes her user profile data indicating that her last name has changed but does not change her marital status, then aspects include campaign module 212 having instructions to identify the milestone event using this data as one variable of the propensity model that is weighted accordingly.

Propensity modeling module 214 may be a portion of memory 208 configured to store instructions, that when executed by processor 206, cause processor 206 to calculate a propensity score in accordance with a mathematical propensity model directed to a particular goal addressed by the campaign. Propensity modeling module 214 may include instructions to facilitate a propensity model utilizing the data variables accessed via one or more data sources (e.g., data stored in data sources 128.1-128.N) as specified by the campaign criteria. Additionally or alternatively, propensity modeling module 214 may include instructions regarding the mathematical construct of the propensity model, details regarding the application and/or calculation of the propensity model such as variable weights, for example, and/or may facilitate the calculation of a propensity score as a propensity model output.

In various aspects, propensity modeling module 214 may facilitate the calculation of a propensity score in accordance with any suitable propensity modeling techniques. For example, using data from one or more sources as dependent variables, the propensity score may be calculated using a logistic regression expression based upon a particular behavior or event for which a propensity score is desired.

The propensity model score may be calculated via one or more matching techniques in which the impact of the variables (e.g., the data) are compared to model outputs from known sets of data having a known propensity score. The propensity model score may use such comparison techniques, such as nearest neighbor matching, caliper matching, mahalanobis metric matching in conjunction with propensity score matching, stratification matching, difference-in-differences matching (e.g., kernel and local linear weights), exact matching, etc.

Targeted message module 216 may be a portion of memory 208 configured to store instructions, that when executed by processor 206, cause processor 206 to send a targeted message to a user when a milestone event has been met. In the present aspects, targeted message module 216 may include instructions specifying the message content (e.g., the text of the message), the message delivery channel (e.g., an email address, a postal address, a text message number, an Internet Protocol (IP) address associated with a device utilizing a web-based application, etc.), a media type to be used when delivering the targeted message (e.g., images, web page banner designs, audio, video, a graphical layout for an email message, etc.)

In other words, the instructions stored in campaign module 212 may indicate that an occurrence of a milestone event has exceeded a threshold probability as indicated by the propensity score threshold included in the campaign framework data. The instructions stored in targeted message module 216 may be executed by processor 206 so that the appropriate target message may be sent to a user having a specific design and method of delivery as specified by the campaign criteria.

In the various aspects described herein, message optimization engine 200 may provide for the generation and delivery of more relevant targeted messages to one or more users. Additionally or alternatively, these aspects provide other benefits relating to the technical operation of message optimization engine 200 and/or the one or more data sources used by message optimization engine 200 to generate and deliver targeted messages.

In various aspects, message optimization engine may advantageously utilize data to narrow down a potential target pool of users via batch processing, which is further discussed below with reference to FIG. 3. Thus, in accordance with such aspects, processor 206 may perform more efficiently than it otherwise would with large and/or random sampling methods. The prioritization rules resolving conflicts arising from a user meeting the conditions of more than one campaign goal may also provide such benefits.

Furthermore, the overall message optimization process may also provide benefits such as decreased network bandwidth, as messages are sent in accordance with a user's preferences and/or a specific campaign criteria. This helps to avoid the delivery of redundant messages and/or may prevent messages in less efficient or relevant formats from being delivered altogether. Because of the increased efficiency, power may also be saved (locally at message optimization engine 200 as well as at a recipient device) that would otherwise be utilized for the transmission and/or reception of unoptimized messages.

As will be appreciated by those of ordinary skill in the relevant art(s), although data read/write module 210, application module 211, campaign module 212, propensity modeling module 214, and targeted message module 216 are illustrated as separate modules, any instructions included in each of the respective modules may be combined with other modules and/or may be stored in a memory that is separate from memory 208.

Exemplary Delivery of Target Messages in Accordance with Specific Campaigns

One example of a campaign may utilize online targeted messaging directed towards mobile users interested in switching to a new insurance provider for automotive insurance. In such a case, the campaign criteria may include a propensity score indicating a likelihood of a mobile user wanting to switch to a new insurance provider for automotive insurance coverage. In other words, the new insurer may specify an insurance campaign milestone event that is satisfied upon the propensity score indicating that a particular user fits this scenario.

To calculate the propensity score, variables may be considered such as (1) the geographic location of the user, (2) whether the user interacted with an advertisement online (e.g., by "clicking" on it), and (3) whether the device was a mobile device. Again, the propensity model may apply any weighting to these variables. But assuming that these variables are all given the same weight for this example, the campaign criteria may include a geographic region (e.g., a geofence, zip code, regional area, etc.) and/or specify a threshold propensity score of 66%. In this case, if two out of three of the variables are true, then the threshold propensity score would be exceeded, indicating a higher likelihood that a user has been identified fitting the targeted archetype for which the campaign was intended.

The targeted message may be delivered to the device using a channel and format specified by the campaign criteria. Continuing the previous example, if the threshold propensity score is exceeded, then an mobile optimized message may be generated and displayed on the user's device explaining, for that same user in that geographic location, how much the user could save by switching to the new insurer's automotive policy.

To provide a second example, a campaign may be directed towards generating one or more targeted messages for a person that was just married. In other words, the insurer may specify an insurance campaign milestone event that is satisfied upon the propensity score indicating that the customer was recently married. In such a case, the campaign criteria may or may not include a propensity score indicating a likelihood of the person being married. As previously discussed, an explicit determination of such an event (e.g., through a phone call and confirmation by the customer, by a visit to an agent in which the customer informed the agent of the marriage, etc.) may make the propensity calculation unnecessary or, alternatively, set the propensity score to 100%.

In either case, upon the threshold propensity score being exceeded, the campaign criteria may specify one or more targeted messages tailored to the customer's needs and preferences. For example, the campaign criteria may include a targeted message suggesting a personal articles policy (since the person may want to insure the engagement ring), a congratulations card sent in accordance with the delivery channel indicated by the customer's profile data (e.g., direct mailing, email, etc.).

In some aspects, message optimization engine 200 may utilize campaign criteria to generate targeted messages to customers in a way that reacts to data as it is received, which may be in real-time. However, in other aspects, which will be further discussed below with reference to FIG. 3, campaigns may be executed by message optimization engine 200 in batches in accordance with any suitable schedule using data collected from one or more data sources. In this way, as each campaign is executed, customers or other users may be identified whom appropriately match the campaign criteria by each campaign's propensity score threshold.

To provide a third example illustrating a batch campaign process, a campaign may be directed towards cross selling automotive insurance products to existing insurance customers with renters insurance, life insurance, and/or health insurance. The campaign criteria may be selected in a strategic way that specifically excludes some customers, for example, such as homeowner policy customers, to whom the targeted message may be less relevant. The insurance milestone event indicated by the campaign criteria may include, for example, data indicating (e.g., browser history) that the customer's propensity score for being interested in purchasing an automotive policy within a threshold window (e.g., 3 months, 4 months, etc.) prior to the expiration of one or more current policies.

To provide a fourth example, a campaign may be directed to presenting targeted messages to existing customers that have started the online application process but not completed it. In such a case, the insurance milestone event indicated by the campaign criteria may include, for example, a propensity data score using data to indicate that an insurance customer abandoned the life insurance application process. The propensity modeling calculation may analyze and weight data variables that indicate that the customer was authenticated online via his logon credentials to the insurer's web-based application and that the customer's browsing habits show that the user began filling out an application for life insurance, answered a threshold number of prompts, but then stopped the process before it was completed.

Upon the propensity modeling score threshold being exceeded, the targeted message may be delivered to the device using a channel and format specified by the campaign criteria. The targeted message may include any suitable text to try to address this behavior, such as a promotional discount for combining auto and life insurance, a reminder to complete the application process, etc.

Exemplary Execution of Batch Campaign Processes

Figure 3:
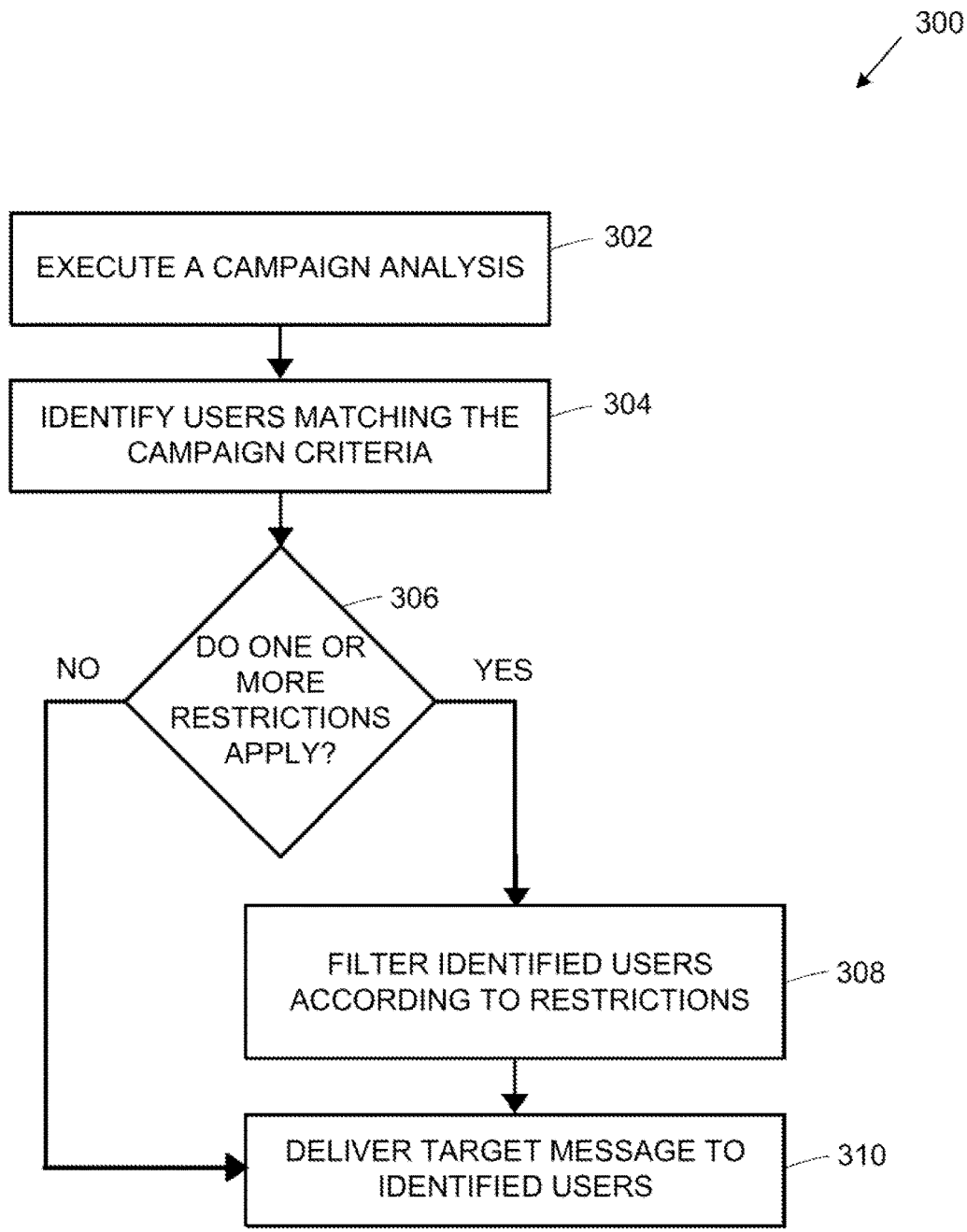
FIG. 3 illustrates an exemplary method 300 in accordance with one aspect of the present disclosure.

FIG. 3 illustrates an exemplary method 300 in accordance with one aspect of the present disclosure. In the present aspect, method 300 may be implemented by any suitable computing device (e.g., computing device 120 or message optimization engine 200, as shown in FIGS. 1 and 2, respectively). In one aspect, method 300 may be performed by one or more processors, applications, and/or routines, such as processor 206 executing instructions stored in one more modules of memory 208, for example, as shown in FIG. 2.

Method 300 may start when one or more processors begin executing a campaign analysis (block 302). In some aspects, the campaign analysis may be executed automatically in accordance with a schedule defined by the campaign criteria (e.g., once per week, once per month, etc.) (block 302). In other aspects, the campaign analysis may be executed by a user interacting with a suitable computing device using any suitable techniques, such as a graphical user interface (GUI), for example, (block 302). The campaign may be executed by one or more processors utilizing data from one or more data sources, as previously discussed with reference to FIGS. 1 and 2 (block 302).

Method 300 may include one or more processors identifying users matching the campaign criteria (block 304). This identification may be performed, for example, by applying data as weighted variables of a mathematical propensity model, calculating a propensity model output score, and/or determining those users whose propensity score meets or exceeds a threshold propensity score included in the campaign criteria (block 304). Again, the data analyzed for each of the users and/or the weights applied to the propensity model in accordance with any suitable campaign event in which the campaign goal is directed (block 304).

Method 300 may include one or more processors determining whether one or more restrictions and/or exceptions apply once the users are identified (block 306) that match a specific campaign criteria (block 304). If one or more restrictions apply, then method 300 may continue to deliver the targeted message (block 310) to the identified users (block 304). However, if one or more restrictions do apply, then method 300 may continue to filter the users according to the one or more restrictions (block 308).

Method 300 may include one or more processors filtering the identified users (block 304) according to one or more restrictions (block 308). In some aspects, these restrictions may be included as part of the campaign criteria. In other aspects, these restrictions may be included in one or more data sources separate from the campaign criteria and the determination made (block 306) once the users matching the campaign criteria have been identified (block 304).

The restrictions may include any suitable set of logic, rules, and/or exceptions that may further narrow the identified users (block 304) to disqualify or otherwise eliminate those users from being sent targeted messages (block 308). For example, the one or more restrictions may include marketing restrictions, restrictions based upon state or local laws prohibiting such messages from being generated and/or from offering certain types of products, "fatigue" exceptions preventing too many targeted messages from being sent to a user within the same period of time, rules removing the user from the list of identified users based upon a message prioritization system, etc.

Regarding prioritization rules, aspects include method 300 applying a predetermined list of rules, which may be defined as part of the campaign criteria, to users identified for more than one campaign criteria. These rules may prioritize, for example, some campaigns over others and/or a maximum number of targeted messages that may be sent to a user within a period of time. For example, if twenty campaign analyses are executed (block 302) and a single user is identified as matching the campaign criteria for six campaigns, then method 300 may resolve this in accordance with the campaign prioritization rules specified in each campaign criteria (block 308). This may include, for example, identifying a prioritization label or identifier for each of the six campaigns and sending targeted messaged in accordance with those of the highest priority (block 308). To provide another example, this may include randomly selecting a subgroup of the six campaigns such that a maximum message count is not exceeded (block 308).

Method 300 may include one or more processors delivering the target message to the identified users (block 310). In some aspects, these identified users may be the same as those initially identified as matching the campaign criteria when the campaign was executed (block 304). In other aspects, these identified users may be the filtered group of users narrowed from the initial identified users (block 304) based upon one or more applied restrictions (block 310). Again, the target message may be delivered to each of the users having message content in accordance with the delivery channel included in the campaign criteria (block 310).

Exemplary Targeted Message Generation for Insurance

Figure 4:
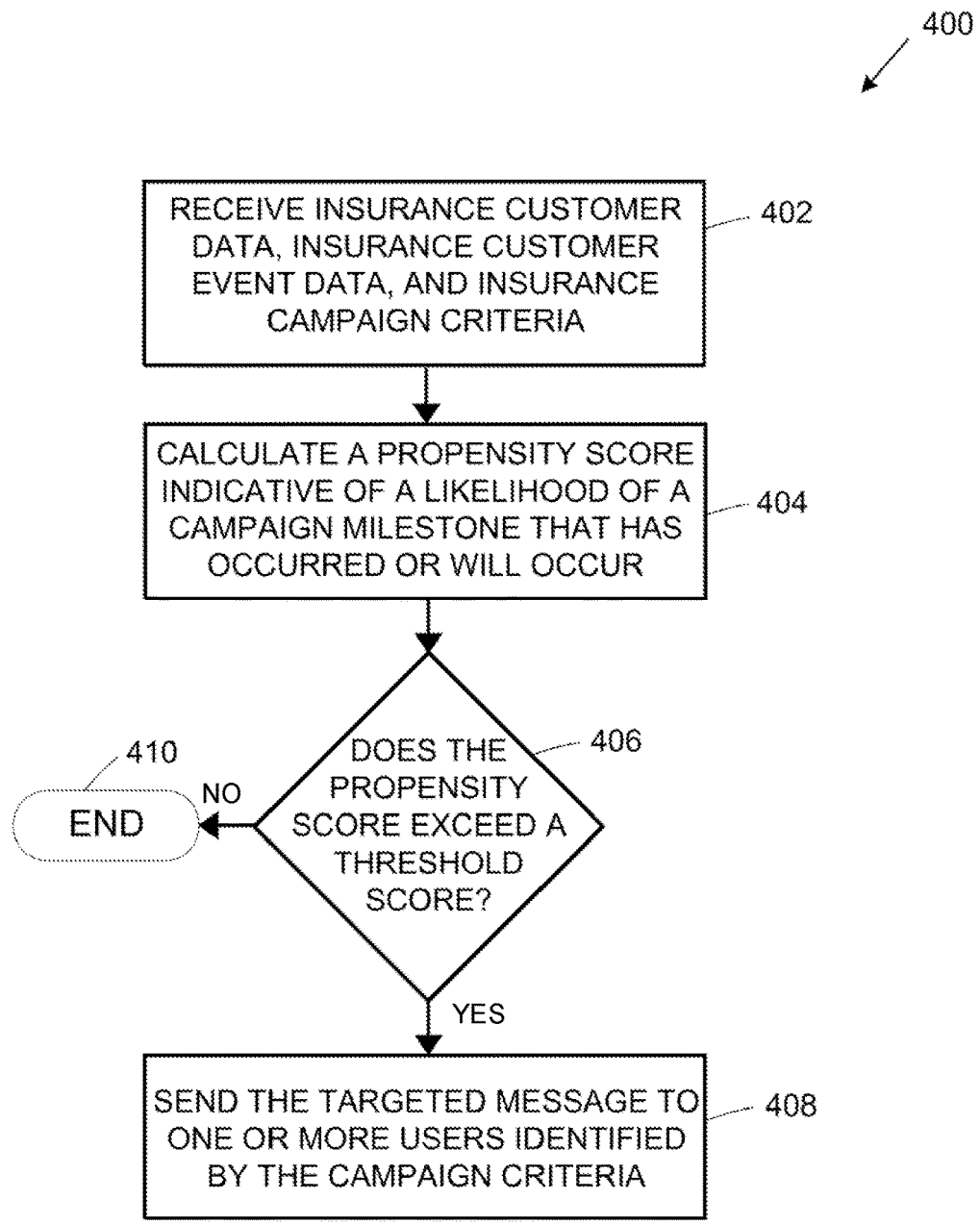
FIG. 4 illustrates an exemplary method 400 in accordance with an exemplary aspect of the present disclosure.

FIG. 4 illustrates an exemplary method 400 in accordance with an exemplary aspect of the present disclosure. In the present aspect, method 400 may be implemented by any suitable computing device (e.g., computing device 120 or message optimization engine 200, as shown in FIGS. 1 and 2, respectively). In one aspect, method 400 may be performed by one or more processors, applications, and/or routines, such as processor 206 executing instructions stored in one more modules of memory 208, for example, as shown in FIG. 2.

Method 400 may start when one or more processors receive insurance customer data, insurance customer event data, and/or insurance campaign data (block 402). In some aspects, any combination of the insurance customer data, insurance customer event data, and/or insurance campaign data may be received automatically and/or as part of an application executed by a user (block 402).

The insurance customer data may include, for example, customer data identifying the customer or products associated with the customer, such as contact information, birthdates, data associated with the customer's user profile, demographic data, etc. (block 402). Customer event data may include, for example, browsing habits, changes in the user profile data (e.g., marital status or last name being changed), and/or any other suitable type of data used to determine whether a campaign milestone event has occurred or will occur (block 402). Again, the campaign criteria may include rules, exceptions, restrictions, propensity score thresholds, etc., directed to a campaign advertising and/or marketing goal (block 402). The insurance customer data, insurance customer event data, and/or insurance campaign data may be received from any suitable source, such as a local memory (e.g., memory 208, as previously discussed with reference to FIG. 2), a front end (e.g., front end 102, as shown in FIG. 1) and/or one or more data sources (e.g., data sources 128.1-128.N, as previously discussed with reference to FIG. 1).

Method 400 may include one or more processors calculating a propensity score indicative of a likelihood that a campaign milestone event has occurred or will occur (block 404). Again, this propensity score may be calculated by implementing any suitable propensity model type and may utilize any suitable number of data variables based upon the type of milestone event that is targeted by the campaign advertising and/or marketing goal, as specified in the campaign criteria (block 404). This propensity score may be calculated by the propensity model conforming to any suitable scale and/or range of values, such as between 0 and 1, between 0% to 100%, etc., in which an increasing propensity score value indicates an increasing likelihood that the milestone event has occurred or will occur (block 404).

Method 400 may include one or more processors determining whether the calculated propensity score (block 404) meets or exceeds the propensity threshold score as indicated in the received (block 402) campaign criteria (block 406). If so, then method 400 may proceed to send a targeted message (block 408). Otherwise, method 400 ends, which may include a termination or a momentary pause of execution of the relevant application that is used in conjunction with the campaign (block 410).

Method 400 may include one or more processors sending the targeted message to one or more users identified by the campaign criteria (block 408). Again, the target message may be delivered to each of the users having message content in accordance with the delivery channel included in the campaign criteria (block 408).

Exemplary Methods of Generating Targeted Messages

In one aspect, a computer-implemented method of generating a targeted message for delivery to an insurance customer may be provided. The method may include (1) receiving, by one or more processors, insurance customer data; (2) receiving, by one or more processors, insurance customer event data indicative of a potential insurance campaign milestone that is relevant to an insurance marketing or advertising goal; (3) receiving, by one or more processors, insurance campaign criteria for the insurance marketing or advertising goal, the insurance campaign criteria including (i) a threshold propensity score, and/or (ii) a delivery channel for delivering the targeted message to the insurance customer; (4) calculating, by one or more processors, a propensity score utilizing the insurance customer data and the insurance customer event data as variables in a mathematical propensity model, the propensity score being indicative of a probability that the insurance campaign milestone event has occurred or will occur; and/or (5) sending, by one or more processors, the targeted message to the customer in accordance with the delivery channel specified by the insurance campaign criteria when the propensity score exceeds the threshold propensity score. The method may further include receiving feedback from the customer or an acceptance of an insurance offering; adjusting one or more insurance policies for the customer based upon feedback received; and/or otherwise providing insurance-based cost savings or other benefits to customers. The method may include additional, less, or alternate actions, including those discussed elsewhere herein.

For instance, the propensity score may be calculated as 100 percent when the insurance customer data explicitly indicates that the insurance campaign milestone has occurred. The insurance customer data may include data received from one or more sources, such as an insurer data source, a third party source, and/or a publicly available source.

Additionally or alternatively, the targeted message may be sent as part of a banner advertisement within a graphical user interface (GUI) to a device in conjunction with a web-based application.

In various aspects, a batch campaign analysis may be performed and the insurance customer may be one of several insurance customers that match the campaign criteria. In accordance with such aspects, the acts of (i) receiving the insurance customer data, (ii) receiving the insurance customer event data, (iii) calculating the propensity score, and/or (iv) sending the targeted message for each of the plurality of insurance customers having a respective propensity score that exceeds the threshold propensity score.

Furthermore, the insurance campaign milestone event may be one of several exemplary events including (1) the insurance customer moving to a new address; (2) the insurance customer purchasing a new vehicle; (3) the insurance customer purchasing a new home; (4) the insurance customer getting married; (5) the insurance customer wanting to terminate an insurance policy; and/or (6) the insurance customer wanting to add a new insurance policy and/or otherwise alter existing insurance policies, deductibles, limits, or coverages.

Additionally or alternatively, the insurance campaign criteria may include an insurance customer geographic location. In accordance with such aspects, the targeted message may be sent to the customer when the insurance customer data indicates that a geographic location of the insurance customer matches the geographic location included in the insurance campaign criteria.

Exemplary Non-Transitory Computer Readable Medium

In another aspect, a non-transitory computer readable media may be described having instructions stored thereon in a computing device to generate a targeted message for delivery to an insurance customer that, when executed by a processor, cause the processor to: (1) receive insurance customer data; (2) receive insurance customer event data indicative of a potential insurance campaign milestone that is relevant to an insurance marketing or advertising goal; (3) receive insurance campaign criteria for the insurance marketing or advertising goal, the insurance campaign criteria including (i) a threshold propensity score, and (ii) a delivery channel for delivering the targeted message to the insurance customer; (4) calculate a propensity score utilizing the insurance customer data and the insurance customer event data as variables in a mathematical propensity model, the propensity score being indicative of a probability that the insurance campaign milestone event has occurred or will occur; and/or (5) send the targeted message to the customer in accordance with the delivery channel specified by the insurance campaign criteria when the propensity score exceeds the threshold propensity score. The instructions may further relate to receiving feedback from the customer or an acceptance of an insurance offering; adjusting one or more insurance policies for the customer based upon feedback received; and/or otherwise providing insurance-based cost savings or other benefits to customers. The non-transitory computer readable media may include instructions with additional, less, or alternate functionality, including that discussed elsewhere herein.

For instance, the propensity score may be calculated as 100 percent when the insurance customer data explicitly indicates that the insurance campaign milestone has occurred. The insurance customer data may include data received from one or more sources such as an insurer data source, a third party source, and/or a publicly available source.

Additionally or alternatively, the non-transitory media may include instructions that, when executed by a processor, cause the processor to send the targeted message as part of a banner advertisement within a graphical user interface (GUI) to a device in conjunction with a web-based application.

In various aspects, the non-transitory media may include instructions that, when executed by a processor, cause the processor to perform a batch campaign analysis, with the insurance customer being one of several insurance customers that match the campaign criteria. In accordance with such aspects, the non-transitory media may include instructions that, when executed by a processor, cause the processor to (i) receive the insurance customer data, (ii) receive the insurance customer event data, (iii) calculate the propensity score, and/or (iv) send the targeted message for each of the plurality of insurance customers having a respective propensity score that exceeds the threshold propensity score.

Furthermore, the insurance campaign milestone event may be one of several exemplary events including (1) the insurance customer moving to a new address; (2) the insurance customer purchasing a new vehicle; (3) the insurance customer purchasing a new home; (4) the insurance customer getting married; (5) the insurance customer wanting to add or change insurance policies, limits, coverages, deductibles, etc.; and (6) the insurance customer wanting to terminate an insurance policy.

Additionally or alternatively, the insurance campaign criteria may include an insurance customer geographic location. In accordance with such aspects, the non-transitory media may include instructions that, when executed by a processor, cause the processor to send the targeted message to the customer when the insurance customer data indicates that a geographic location of the insurance customer matches the geographic location included in the insurance campaign criteria.

Exemplary Message Optimization Engine

In yet another aspect, a message optimization engine may be described including a communication unit configured to: (1) receive insurance customer data; (2) receive insurance customer event data indicative of a potential insurance campaign milestone that is relevant to an insurance marketing or advertising goal; and/or (3) receive insurance campaign criteria for the insurance marketing or advertising goal, the insurance campaign criteria including (i) a threshold propensity score, and/or (ii) a delivery channel for delivering the targeted message to the insurance customer. The message optimization engine may also include a processor configured to calculate a propensity score utilizing the insurance customer data and the insurance customer event data as variables in a mathematical propensity model, the propensity score being indicative of a probability that the insurance campaign milestone event has occurred or will occur. The communication unit is further configured to send the targeted message to the customer in accordance with the delivery channel specified by the insurance campaign criteria when the propensity score exceeds the threshold propensity score. The message optimization engine may include additional, fewer, or alternate components, including those discussed elsewhere herein.

For instance, the propensity score may be calculated by the processor as 100 percent when the insurance customer data explicitly indicates that the insurance campaign milestone has occurred. The insurance customer data may include data received from one or more sources, such as an insurer data source, a third party source, and/or a publicly available source.

Additionally or alternatively, the processor may be configured to cause the communication unit to send the targeted message as part of a banner advertisement within a graphical user interface (GUI) to a device in conjunction with a web-based application.

In various aspects, the processor may be configured to perform a batch campaign analysis, with the insurance customer being one of several insurance customers that match the campaign criteria. In accordance with such aspects, the communication unit may be configured to receive the insurance customer data and the insurance customer event data for each of the customers. The processor may also be configured to calculate the propensity score using the data associated with each of the customers and/or cause the communication unit to send the targeted message for each of the plurality of insurance customers having a respective propensity score that exceeds the threshold propensity score.

Furthermore, the insurance campaign milestone event may be one of several exemplary events including (1) the insurance customer moving to a new address; (2) the insurance customer purchasing a new vehicle; (3) the insurance customer purchasing a new home; (4) the insurance customer getting married; and/or (5) the insurance customer wanting to add, change, or terminate an insurance policy.

Additionally or alternatively, the insurance campaign criteria may include an insurance customer geographic location. In accordance with such aspects, the processor may be configured to cause the communication unit to send the targeted message to the customer when the insurance customer data indicates that a geographic location of the insurance customer matches the geographic location included in the insurance campaign criteria.

Exemplary Needs, Analysis, & Recommendation Engine

Generally, a system and method may relate to providing needs, analysis, and recommendations to online customers (such as via a Needs, Analysis, and Recommendation (NAR) engine discussed below). The present embodiments may, for example, (1) provide a personalized customer experience that presents messages at the peak of relevancy; (2) leverage existing customer platforms; (3) provide a multi-channel marketing analytics engine; (4) consider new data before making a recommendation; (5) provide recommendations that improve over time; (6) enhance online targeted messaging; and/or (7) enable marketing strategy to encompass all customer communication channels (email, direct mail, phone, etc.).

More specifically, recommendations may be generated based upon campaign (and/or milestone) rules, triggers, message choice, etc. in conjunction with supporting data, such as customer data that may allow personalized recommendations. Customers and/or insurance sales agents may 'opt-in' to a program associated with the present functionality of generating personalized recommendations. Additionally, marketing campaigns may target new or existing customers that have had or are about experience a life event (marriage, birth, move, etc.). Due to the life event, the customer may have a propensity to buy additional or different insurance, and/or switch insurance providers.

The present embodiments may address several of today's challenges, such as message timing and relevance; meeting individuals' changing communication preferences; and/or enhance data quality and availability. Batch and/or online improvements provided may include timing messages at the peak of peak of relevancy; unique user interfaces; improving marketing campaign workflow; tight integration on a wide variety of customer data; running propensity models within online campaigns; integrating online campaigns with offline campaigns; providing sophisticated multivariate testing capabilities; recommending messaging for insurance agents and/or call centers; and/or improved analytical tools.

Customer data may be integrated with marketing and planning data. For instance, software modules may manage customer eligibility and/or system optimization. Real time decision making software may apply campaign criteria in real time and/or provide customer recommendations in real time. Prioritization and/or ranking of message recommendations may be provided. Global marketing restrictions may be employed, such as budgeting or customer fatigue restrictions. Predictive modeling and/or propensity scores may be used, and model performance may be monitored. Online browser data may be collected (with customer permission). After which, online messages may be generated and delivered to the customer's browser.

In some embodiments, a Needs, Analysis, and Recommendations (NAR) engine may enable the right message: (a) from the right agent or sales associate; (b) at the right time; (c) in the right channel; (d) with the right preferences; (e) in the right language; and/or (f) to the right person. The NAR engine may use data from available sources to match customers with products that they are most likely to purchase and determine the next best opportunity messaging. The NAR engine may consist of modules associated with online data capture and presentment. The NAR engine may include batch and real-time marketing tools for direct mail, e-mail, and digital messaging. The NAR engine may manage offer targeting, testing, and optimization across all marketing communications channels.

The NAR engine may be integrated with other web services to provide personalized customer messaging in customer interactions. It may utilize a business platform supporting an internet presence and may be used in agent's offices and/or call centers. It may provide for customer segment determination; quote and purchase flow, and/or billing or customer communications. The NAR engine may provide an insurance provider with a consolidated tool suite. It may facilitate consistent marketing messaging across all customer touch points, and/or sharing of customer behavioral data across access and communication channels (with the customer's permission).

With a customer's permission, the customer interactions and online marketing history may be captured and stored, which drives the delivery and optimization of marketing at an individual customer level, such as across all marketing campaign channels (direct mail, email, online, etc.). Targeted locations may be identified on a web page for dynamic content injection without HyperText Markup Language (HTML) changes. The online targeted messages delivered to the customer may also be used as criteria to not repeat the message based upon a customer's interaction with the message, such as clicking on a call to action.

This solution allows the business to capture and define customer interactions, such as clicks, form entry, and browser data, which may be referred to as "milestones" or "marketing campaign milestones" herein. Milestones may be used across all marketing campaigns to increase message relevancy to our customers and/or sales agents for improved acquisition and retention. Milestones may be defined by a line of business and associated to both authenticated online customers as well as returning visitors based upon business needs. Milestones may also relate to milestone propensity scores, or a propensity score that may be calculated in relation to a given milestone or marketing campaign, in one embodiment.

Figure 5:
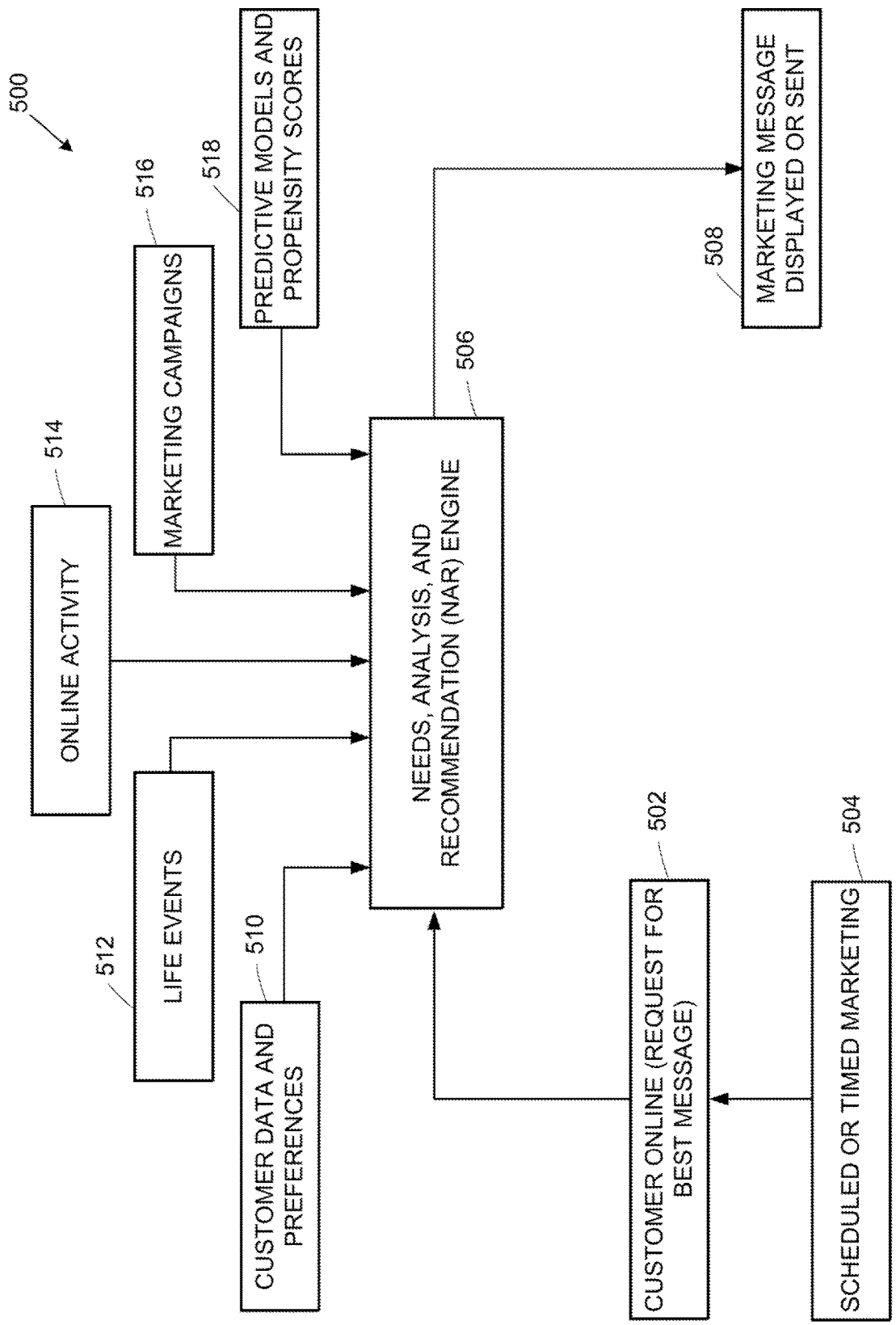
FIG. 5 illustrates an exemplary method of targeted message generation 500.

FIG. 5 illustrates an exemplary method of targeted messaging generation 500 that utilizes a Needs, Analysis, and Recommendation (NAR) engine 506. The method of targeted messaging generation 500 may utilize a number of data feeds. For instance, customer data, such as customer details, preferences, and/or customer insurance policy/account ownership may be used and/or provided via a customer data feed 510. As shown in FIG. 5, other data feeds may include or be associated with life events 512, customer online activity 514; marketing campaigns 516 (e.g., campaign data); predictive models and/or propensity scores 518, and/or other data feeds.

The customer data (or data stream) 510 may provide the facts that the system and method analyze to make a recommendation. Business rules may be applied to transform raw data into usable, analytic variables. In some embodiments, the customer data may originate from the customer or the customer's computing devices, or other sources. The customer data 510 may include customer preferences about message delivery preferences (email, mail, social media, telephone, etc.).

Another data feed may relate to life events 512. A life event may a happening or incident that may affect a customer's needs or drive actions to be completed. In some aspects, only certain events are considered (such as for efficiency). A marketing reason may be used to trigger a recommendation, and the event needs to be timely. For online messaging, trends identified by the campaign may trigger events. Events may be explicit and have a result that is readily identifiable (e.g., marriage). Additionally or alternatively, events may be inferred and may be based upon analyzing data (e.g., last name change may indicate marriage).

A marketing campaign data feed 516 may also be used. A campaign may a strategy to promote a product, service, or business to a customer. Campaign types may include upselling, cross selling, wining back, thanking a customer, etc. A campaign may include business logic and rules (both inclusions and exclusions), timing for when the campaign applications; and/or associated messages (direct mail, images, embedded text, etc.). Customer and/or message selection may be based upon campaigns that are active at the time of a request or presently.

Yet another data feed may relate to predictive models and/or propensity scores 518. A predictive model may be a mathematical formula for determining the likelihood of a customer to do something—which may be positive or negative from the advertiser's perspective, such as how likely a customer is defect or how likely a customer is to purchase a product or service. The predictive model may utilize trends, patterns, and/or correlations in historical and supporting data. A propensity score may be an output from a predictive model. The propensity score may be used as input into making or ranking a recommendation. The propensity score may be represented by a numeric value and/or ranked by percentile or category. Of course, all of the data and/or data feeds must comply with information privacy regulations, including sensitive or non-public personal information guidelines.

As shown in FIG. 5, targeted messages may be generated and sent to a customer 508 based upon the NAR engine 506 determining that a customer is online and/or receiving a request for a best or most relevant targeted advertising message 502. The NAR engine 506 may receive several data feeds 510-518 and/or analyze (1) customer data; (2) customer delivery preferences; (3) life events (marriages, births, moves, etc.); (4) marketing campaign information; (5) customer online activity; (6) predictive modeling or propensity scoring; and/or any combination thereof.

In one exemplary embodiment, the marketing campaign information may include marketing campaign milestones. The milestones may be associated with and/or or defined by the customer data, life events, customer online activity, or other factors. The milestones may be satisfied when the customer data; life events; customer online activity associated with the milestone; and/or when corresponding predictive models or propensity scores are met and/or occur. Other marketing campaign information and/or milestones may be used.

The NAR engine 506 may also provide for scheduled marketing 504, such as providing timed messages or data changes. If it is determined that a customer is online and/or that the customer has made a request for information via an online channel, a message recommendation may be generated, sent, and then displayed on the customer's computing device. As shown in FIG. 5, the message recommendation may be generated on a number of data types and/or data feeds, including customer data and preferences, events, marketing campaigns, and/or predictive models and/or propensity scores.

Exemplary Scenarios

In one embodiment, a batch engine may be used to generate messages. For instance, a campaign may be defined by a marketing strategy, such as one related to homeowners insurance customers that are likely to defect. The system and method may identify homeowners having a high propensity for defection, such as for homeowners insurance customers having policies due to expire in 3 months. A search may be run weekly or monthly on a batch of policies to determine such homeowners.

In one scenario, a marketing department may create a campaign that targets customers with a high propensity for homeowners insurance defection. The targeting processing may be triggered based upon a pre-defined timing, such as monthly. A list of customers that meet the campaign criteria may be created. The campaign may determine how messages for a specific customer are ranked. Then, the best or most relevant messages for a specific customer may be selected, and one or more optimized marketing messages may be sent to the identified customers.

The present embodiments may enable online targeted messaging capabilities, establish an online data store, including data and refresh schedules, and/or provide real time decision making and/or online data collection software. The present embodiments may also deliver online targeted messaging, establish or provide the capability to analyze online message effectiveness, enhance analytical capabilities using tracking or other data, and/or expand propensity modeling to include prospects and leads.

In one online targeted messaging scenario, a user or customer, at a vehicle valuation website (such as Kelly Blue Book) may click upon or select an online advertisement from an insurance provider (such as State Farm) using their mobile device. The NAR engine or module may use behavioral or other data to identify that the person is (i) currently in Wisconsin (using geo-location capabilities), and/or interested in vehicles (indicated by arriving at vehicle valuation website). The NAR engine or module may identify the best message and send that to the user or customer. On the insurance provider website (e.g., statefarm.com), the customer may see a mobile-optimized message that Wisconsin customers may save on their auto insurance when they switch to the insurance provider.

In this scenario, the NAR engine may determine a category of interest for the customer from online activity of the customer, such as what website or type of website the customer is viewing, and/or how long they are at the website. The NAR engine may also determine the current location of the customer, such as from home address or GPS location of their mobile device. Based upon the category of interest and/or current location, the NAR engine may push a message directly to the customer, or push a message to a website providing messaging capabilities (such as storing messages in an inbox that the customer may view when they visit the website) to the customer, such as a financial services or insurance provider website.

The present embodiments may further integrate targeted messaging with account and policy communication (trans-promotional messaging), continually improve needs, analysis, and recommendation analytical capabilities using additional data, and/or enable component-based messaging for dynamic direct mail. This may provide truly personalized messaging and testing of individual message components instead of static pieces.

In one event-driven campaign scenario, a customer may walk into an insurance agent's office, or during a telephone conversation with the agent or insurance representative, may mention that they were recently married (an explicit life event). The agent may update the customer digital or electronic record to indicate the marriage. Also, the NAR engine may, using campaign logic, identify the best targeted message(s) for the customer to receive. For instance, a "personal articles insurance policy" message may be recommended and displayed to the agent on a user interface or a business platform. Additionally or alternatively, the NAR engine may schedule a "Congratulations!" eCard or a direct mail greeting card, depending upon customer preferences.

In another scenario, a campaign may have several customer or household requirements and/or milestones. The campaign (and/or milestones) may be related to, and/or defined by, certain customer data elements, such as age, preferences, address/location, etc. The campaign may also be related to, and/or defined by, certain household data elements, such as who in the family owns what products, household membership, etc. The campaign may further be associated and/or defined by customer-to-customer relationships, whether the target is the head-of-household, whether the household has a relationship with a specific sales agent, whether the campaign requires prerequisite products (such as auto, home, life, or health insurance), etc. For instance, an exemplary campaign may be defined by (1) the target's household must not own any active Auto Policy; (2) the target's household must not own an active Homeowners or Condo Policy, but must own an active Renters, Life, or Health Policy, (3) the target must not have defected a certain type of policy within the past 18 months, and/or (4) the target must never have had an insurance product cancelled. If the NAR engine determines that campaign's requirements are satisfied, such as by analyzing various data streams (e.g., the data streams shown in FIG. 5), then a targeted message may be sent to the customer.

In other scenarios, a customer may set preferences for the types of targeted messages that they would like to receive. The customer may agree to allow a third party to analyze their personal data and/or online activity to automatically generate targeted ads that may likely be of interest to them. For instance, a customer's online activity (such as geolocation, user events, clicking on images, clicking on links, entering text, visiting certain pages, other user interactions) may be analyzed in a "smart" manner. In some embodiments, only limited customer online activity may need to be analyzed. Certain user online interactions may be weighted more than others.

Also, some milestones may require one or more elements, such as a certain type of website was visited. Visiting a vehicle manufacturer website may indicate a potential interest in new vehicles and a need for auto insurance. Visiting a realtor website may indicate a potential interest in purchasing a home and a need for home insurance. And visiting a wedding dress manufacturer may indicate an upcoming website and a need for additional life insurance, as examples.

Additional Exemplary Embodiments

In one aspect, a computer-implemented method of targeting advertising may be provided. The method may include (1) receiving, via one or more processors, an indication from a customer that they would like to opt-in into a targeting marketing campaign and/or have set communication preferences; (2) analyzing, via the one or more processors, customer data associated with the customer and/or customer communication preferences associated with the customer; (3) determining, via the one or more processors, that a life event associated with the customer has happened and/or is likely about to happen (such as from computer analysis of the customer data or from third party websites or databases); (4) determining, via the one or more processors, that the life event is associated with a marketing campaign or a marketing campaign milestone, and/or that a marketing campaign milestone has been reached based upon the life event; (5) predicting or determining, via the one or more processors, that the customer is likely interested in receiving advertising material and/or an offer for products or services via computer analysis, the computer analysis involving a predictive model and/or a propensity score associated with the customer, the predictive model and/or propensity score being determined, by the one or more processors, based upon the customer data and/or the life event; and/or (6) sending or transmitting, via the one or more processors, a message recommendation to the customer (such as to their mobile device or other computing device), the message recommendation being related to the advertising material and/or the offer for the products or services that the customer is likely interested in receiving based upon the computer analysis, to facilitate targeting advertising to those interested in receiving or likely to respond to the targeted advertising.

The method may include additional, less, or alternate actions, including those discussed elsewhere herein. For instance, the message recommendation may relate to auto, homeowners, renters, life, health, or other insurance. The message recommendation may relate to a vehicle or home loan.

In another aspect, a computer-implemented method of targeting advertising may be provided. The method may include (1) receiving, via one or more processors, an acceptance from a customer that they opt-in into a targeting marketing campaign, wherein the targeting marketing campaign analyzes the customer's online activity (such as at a product or service provider's website and/or other websites); (2) analyzing, via the one or more processors, customer data associated with the customer and/or the customer's online activity (such as geolocation, user events, clicking on images, clicking on links, entering text, visiting certain pages, other user interactions) at the product or service provider's website or at other websites (with the customer's permission or after they opt-in to the targeting marketing campaign); (3) determining, via the one or more processors, one or more offers for products or services tailored to the customer based upon (i) computer analysis of the customer data associated with the customer (such as customer current location), and/or (ii) the customer's online activity; and/or (4) causing, via the one or more processors, the one or more offers for products or services tailored to the customer to be presented on a display of a mobile device of the customer when the customer visits a website of the product or service provider that is running the targeting marketing campaign to facilitate completion of the targeted marketing campaign and/or acceptance of offers providing cost savings to customers.

The method may include additional, less, or alternate actions, including those discussed elsewhere herein. For instance, the analysis of the customer data may determine that the customer has incurred or is about to incur a life event, and/or the one or more offers for products or services tailored to the customer may relate to the life event. The one or more offers for products or services relate to offers for auto, home, life, renters, or health insurance products or services, or a vehicle or home loan. Determining, via the one or more processors, one or more offers for products or services tailored to the customer based upon computer analysis of the customer data associated with the customer, and/or the customer's online activity may involve determining a predictive model and/or a propensity score for the customer that indicates a likelihood of the customer accepting an offer for a product or service.

In another aspect, a computer-implemented method of generating a targeted electronic message for delivery to an insurance customer may be provided. The method may include (1) receiving, by one or more processors, insurance customer data associated with an insurance customer; (2) analyzing, by the one or more processors, insurance customer event data and/or insurance customer online activity to determine that an insurance campaign milestone or life event that is relevant to an insurance marketing or advertising goal is satisfied; (3) when the insurance campaign milestone is satisfied, generating, by the one or more processors, a targeted message for the insurance customer based upon the insurance customer data and/or insurance campaign milestone or life event; (4) determining, by the one or more processors, a delivery channel for delivering the targeted electronic message to the insurance customer based upon the insurance customer data or insurance customer preference data; and/or (5) sending, by one or more processors, the targeted electronic message to the customer in accordance with the delivery channel specified by the insurance campaign criteria to facilitate enhanced insurance-related marketing or advertising. The method may include additional, less, or alternate actions, including those discussed elsewhere herein.

In another aspect, a computer-implemented method of generating a targeted electronic message for delivery to an insurance customer may be provided. The method may include (1) receiving, by one or more processors, insurance customer preference data, customer life event data, and/or customer online activity data; (2) analyzing, by the one more processors, the data received with the customer's permission or after they opt-in into a customer rewards program (or other customer program); (3) calculating, by the one or more processors, a propensity score indicative of a probability that an insurance campaign milestone event has occurred or will occur based upon the customer life event data and/or customer online activity data; (4) determining, by the one or more processors, that the propensity score is above a predetermined threshold, and if so, generating, by the one or more processors, a targeted electronic message for the customer; (5) determining, by the one or more processors, a preferred delivery channel from analysis of the insurance customer preference data; and/or (6) transmitting or sending, by the one or more processors, the targeted electronic message to the customer in accordance with or using the preferred delivery channel to facilitate enhanced insurance-related or other targeted marketing or advertising. The method may include additional, less, or alternate actions, including those discussed elsewhere herein.

In another aspect, a computer-implemented method of generating a targeted electronic message for delivery to an insurance customer may be provided. The method may include (1) analyzing, by the one more processors, customer online activity with the customer's permission or after they opt-in into a customer rewards program; (2) determining, by the one or more processors, that a customer life event has occurred or is likely to occur based upon analysis of the customer online activity and/or other customer data or other data sources; (3) calculating, by the one or more processors, a propensity score indicative of a probability that an insurance campaign milestone event has occurred or will occur based upon the customer life event data and/or customer online activity data; (4) determining, by the one or more processors, that the propensity score is above a predetermined threshold, and if so, generating, by the one or more processors, a targeted electronic message for the customer (based upon or associated with a customer life event and/or a related insurance campaign milestone); (5) determining, by the one or more processors, a preferred delivery channel from analysis of insurance customer preference data; and/or (6) transmitting or sending, by the one or more processors, the targeted electronic message to the customer in accordance with or using the preferred delivery channel to facilitate enhanced insurance-related or other targeted marketing or advertising associated with customer life events or insurance campaign milestones. The method may include additional, less, or alternate actions, including those discussed elsewhere herein.

In another aspect, a computer-implemented method of generating a targeted electronic message for delivery to an insurance customer may be provided. The method may include (1) analyzing, by the one more processors, customer online activity with the customer's permission or after they opt-in into a customer rewards program; (2) determining, by the one or more processors, that a customer life event has occurred or is likely to occur based upon analysis of the customer online activity and/or customer data; (3) generating, by the one or more processors, a targeted electronic message for the customer based upon the customer life event; (4) determining, by the one or more processors, a preferred delivery channel from analysis of insurance customer preference data; and/or (5) sending, by the one or more processors, the targeted electronic message to the customer in accordance with the preferred delivery channel to facilitate enhanced insurance-related or other targeted marketing or advertising. The method may include additional, less, or alternate actions, including those discussed elsewhere herein.

In another aspect, a computer-implemented method of generating a targeted electronic message for delivery to an insurance customer may be provided. The method may include (1) analyzing, by the one more processors, the customer online activity with the customer's permission or opt-in into a customer rewards program; (2) determining, by the one or more processors, a category of interest for the customer based upon computer analysis of the customer online activity (such as a type of website that the customer has visited); (3) determining, by the one or more processors, a customer location based upon a GPS (Global Positioning System) location of a computing device of the customer and/or from a current address of the customer; (4) generating, by the one or more processors, a targeted electronic message for the customer based upon (i) the category of interest determined from the customer online activity, and/or (ii) the customer location; (5) determining, by the one or more processors, a preferred delivery channel from analysis of insurance customer preference data; and/or (6) sending, by the one or more processors, the targeted electronic message to the customer in accordance with or via the preferred delivery channel to facilitate enhanced insurance-related or other targeted marketing or advertising. The targeted electronic message may be pushed to an electronic inbox associated with an entity providing the customer rewards program or targeted marketing or advertising. The targeted electronic messages may be associated with offers for auto, home, life, renters, or health insurance products or services, or a vehicle or home loan. The method may include additional, less, or alternate actions, including those discussed elsewhere herein.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

We claim:

1. A computer-implemented method of generating a targeted electronic message for delivery to an insurance customer using a computing device accessing a web-based application hosted by another computing device, the method comprising:

accessing, by one or more processors, insurance customer data;

monitoring, by one or more processors, usage of a graphical user interface (GUI) of the web-based application by the insurance customer; and in response to receipt of insurance customer event data associated with detected usage of the GUI of the web-based application, the insurance customer event data including data indicative of one or more of (i) one or more selections made by the insurance customer via the web-based application, (ii) one or more entries made by the insurance customer via the web-based application, or (iii) a history of web browsing of the insurance customer via the web-based application:

accessing, by one or more processors, insurance campaign criteria for an insurance marketing or advertising goal, the insurance campaign criteria including a threshold propensity score;

calculating, by one or more processors, a propensity score utilizing the insurance customer data and the insurance customer event data as variables in a mathematical propensity model, the propensity score being indicative of a probability that an insurance campaign milestone event has occurred or will occur; and sending, by one or more processors, the targeted electronic message to the customer in response to the propensity score exceeding the threshold propensity score to facilitate enhanced insurance-related marketing or advertising, wherein sending the targeted electronic message to the insurance customer includes causing an advertisement to be presented to the insurance customer within the GUI of the web-based application.

2. The computer-implemented method of claim 1, wherein the insurance customer data further includes data received from a source selected from the group consisting of:
an insurer data source;
a third party source; and
a publicly available source.

3. The computer-implemented method of claim 1, wherein the advertisement is a banner advertisement.

4. The computer-implemented method of claim 1, wherein the insurance campaign milestone event is selected from the group of insurance campaign milestone events consisting of:
the insurance customer moving to a new address;
the insurance customer purchasing a new vehicle;
the insurance customer purchasing a new home;
the insurance customer getting married; and
the insurance customer wanting to terminate an insurance policy.

5. The computer-implemented method of claim 1,
wherein the insurance campaign criteria further includes an insurance customer geographic location, and
wherein sending the targeted electronic message to the customer includes sending the targeted electronic message to the customer when the insurance customer data indicates that a geographic location of the insurance customer matches the geographic location included in the insurance campaign criteria.

6. A non-transitory, tangible, computer-readable medium storing machine readable instructions that, when executed by a processor, cause the processor to:
access insurance customer data;
monitor usage of a graphical user interface (GUI) of a web-based application by an insurance customer; and
in response to receipt of insurance customer event data associated with detected usage of the GUI of the web-based application, the web-based application being accessed by a computing device of the insurance customer and hosted by another computing device, and the insurance customer event data including data indicative of one or more of (i) one or more selections made by the insurance customer via the web-based application, or (ii) one or more entries made by the insurance customer via the web-based application, or (iii) a history of web browsing of the insurance customer via the web-based application;

access insurance campaign criteria for an insurance marketing or advertising goal, the insurance campaign criteria including a threshold propensity score;

calculate a propensity score utilizing the insurance customer data and the insurance customer event data as variables in a mathematical propensity model, the propensity score being indicative of a probability that an insurance campaign milestone event has occurred or will occur; and send a targeted electronic message to the customer in response to the propensity score exceeding the threshold propensity score, wherein sending the targeted electronic message to the insurance customer includes causing an advertisement to be presented to the insurance customer within the GUI of the web-based application.

7. The non-transitory computer-readable medium of claim 6, wherein the insurance customer data further includes data received from a source selected from the group consisting of:
an insurer data source;
a third party source; and
a publicly available source.

8. The non-transitory computer-readable medium of claim 6, wherein the insurance campaign milestone event is selected from the group of insurance campaign milestone events consisting of:
the insurance customer moving to a new address;
the insurance customer purchasing a new vehicle;
the insurance customer purchasing a new home;
the insurance customer getting married; and
the insurance customer wanting to terminate an insurance policy.

9. The non-transitory computer-readable medium of claim 6,
wherein the insurance campaign criteria further includes an insurance customer geographic location, and
wherein the instructions, when executed by the processor, cause the processor to send the targeted electronic message to the customer when the insurance customer data indicates that a geographic location of the insurance customer matches the geographic location included in the insurance campaign criteria.

* * * * *